(12) United States Patent
Chen

(10) Patent No.: US 8,496,124 B2
(45) Date of Patent: Jul. 30, 2013

(54) RACK WITH HOLDER SHEET MEMBERS FOR HOLDING CAP-SHAPED ITEMS

(76) Inventor: Fang-Yin Chen, Taichung (TW)

( * ) Notice: Subject to any disclaimer, the term of this patent is extended or adjusted under 35 U.S.C. 154(b) by 108 days.

(21) Appl. No.: 13/181,670

(22) Filed: Jul. 13, 2011

(65) Prior Publication Data

US 2013/0015147 A1 Jan. 17, 2013

(51) Int. Cl.
*A47F 7/00* (2006.01)

(52) U.S. Cl.
USPC ... 211/49.1; 211/59.2; 211/71.01; 211/85.18; 211/85.31

(58) Field of Classification Search
USPC .......... 211/49.1, 13.1, 14, 15, 59.2, 59.4, 211/71.01, 74, 85.18, 85.23, 85.26, 85.31; 248/311.2, 312, 312.1
See application file for complete search history.

(56) References Cited

U.S. PATENT DOCUMENTS

| | | | | |
|---|---|---|---|---|
| 1,541,532 A * | 6/1925 | Simmons | | 229/201 |
| 2,756,901 A * | 7/1956 | Cowsert | | 221/132 |
| 3,152,697 A * | 10/1964 | Berman et al. | | 211/59.2 |
| 3,265,246 A * | 8/1966 | Messenger | | 221/283 |
| 3,777,933 A * | 12/1973 | Joliot | | 221/309 |
| 3,843,071 A * | 10/1974 | Graham | | 242/588.6 |
| 5,188,226 A * | 2/1993 | Platt | | 206/429 |
| 6,095,584 A * | 8/2000 | Walsh et al. | | 294/166 |
| 6,234,326 B1 * | 5/2001 | Higgins et al. | | 211/74 |

* cited by examiner

*Primary Examiner* — Korie H Chan
(74) *Attorney, Agent, or Firm* — Muncy, Geissler, Olds & Lowe, PLLC

(57) ABSTRACT

A rack includes a supporting open frame, a flat baffle bonded to the supporting open frame, and a flat holder sheet member attached to the supporting open frame over the flat baffle for holding cap-shaped items vertically in a line. The flat holder sheet member has an upper opening, a lower opening, and an elongated slot connected between the upper opening and the lower opening and kept in proximity to the flat baffle.

3 Claims, 6 Drawing Sheets

RACK WITH HOLDER SHEET MEMBERS FOR HOLDING CAP-SHAPED ITEMS

BACKGROUND OF THE INVENTION

1. Field of the Invention

The present invention relates to a rack for holding things and more particularly, to a rack having holder sheet member(s) for holding cap-shaped items.

2. Description of the Related Art

Boxes and plastic bags are commonly used for holding cap-shaped items (such as cap-shaped milk ball, cap-shaped coffee powder ball, etc.). However, storing cap-shaped items in a box or plastic bag cannot keep them in a good order. Further, when using one cap-shaped item, the user must open the box or plastic bag. It is inconvenient to serve cap-shaped items in this manner.

SUMMARY OF THE INVENTION

The present invention has been accomplished under the circumstances in view. It is one item of the present invention to provide a rack, which uses a flat holder sheet member for keeping cap-shaped items vertically in line(s). It is another item of the present invention to provide a rack, which facilitates storage and service of cap-shaped items and saves material consumption.

To achieve these and other objects of the present invention, a rack comprises a supporting open frame, a flat baffle bonded to the supporting open frame, and a flat holder sheet member attached to the supporting open frame over the flat baffle for holding cap-shaped items vertically in a line. The flat holder sheet member has an upper opening, a lower opening, and an elongated slot connected between the upper opening and the lower opening and kept in proximity to the flat baffle.

DETAILED DESCRIPTION OF THE PREFERRED EMBODIMENT

Figure 1:
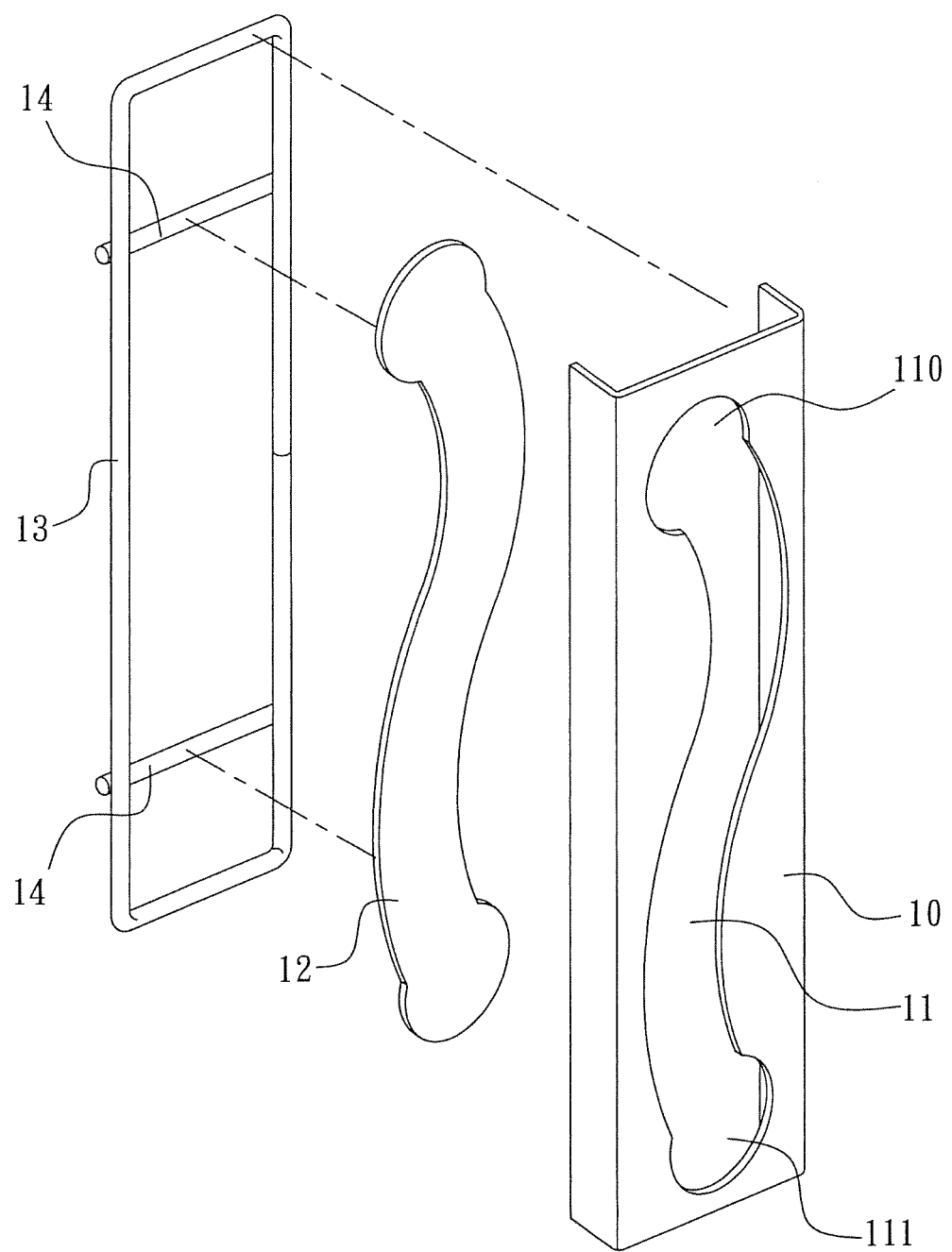
FIG. 1 is an exploded view of a rack in accordance with a first embodiment of the present invention.
Figure 2:
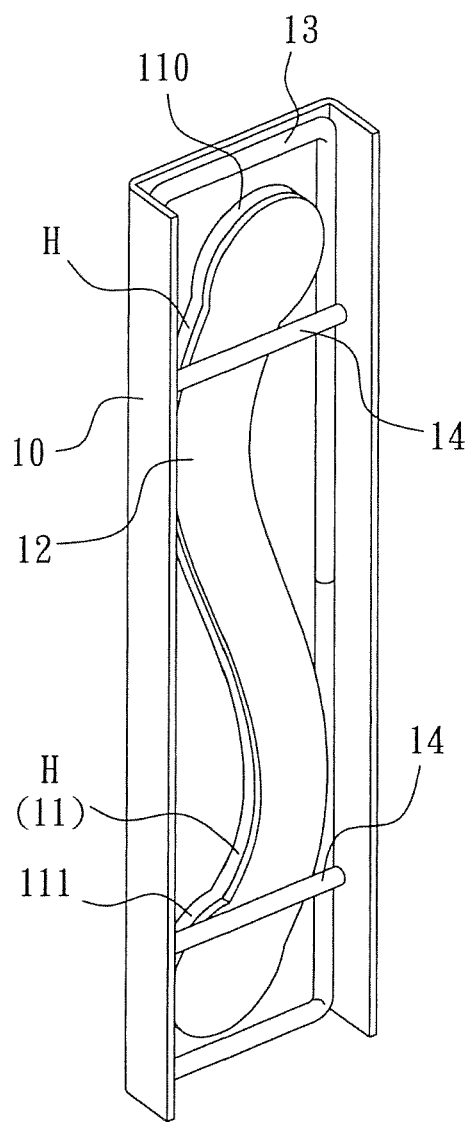
FIG. 2 is an oblique elevational assembly view of the rack in accordance with the first embodiment of the present invention.
Figure 3:
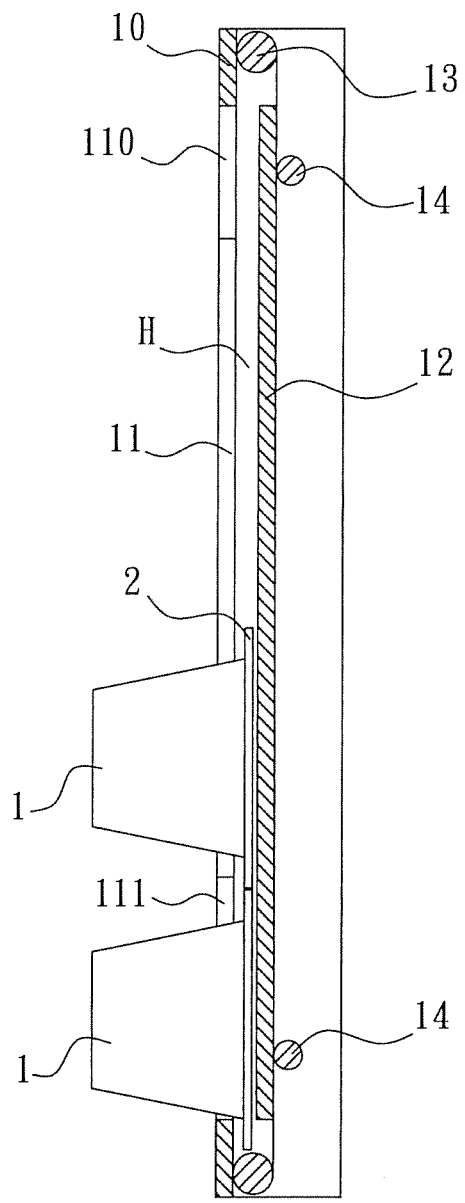
FIG. 3 is an applied view of the first embodiment of the present invention, illustrating cap-shaped items installed in the flat holder sheet member.

Referring to FIGS. 1~3, a rack in accordance with a first embodiment of the present invention is shown comprising a supporting open frame 13 made of wire rods and having two transverse rods 14 arranged at different elevations, a flat baffle 12 bonded to the transverse rods 14, and a flat holder sheet member 10 attached to the supporting open frame 13 over the flat baffle 12 for holding cap-shaped items 1. The flat holder sheet member 10 has an upper opening 110, a lower opening 111 and an elongated slot 11 connected between the upper opening 110 and the lower opening 111. The elongated slot 11 has a width smaller than the diameter of the upper opening 110 and the diameter of the lower opening 111. The flat baffle 12 is configured subject to the combined configuration of the upper opening 110, the elongated slot 11 and the diameter of the lower opening 111. When installed, a gap H is left between the elongated slot 11 and the border of the flat baffle 12.

During application, cap-shaped items 1 can be inserted through the upper opening 110 and lowered along the elongated slot 11 into the gap H to have the rim 2 of each inserted cap-shaped item 1 be retained in between the flat holder sheet member 10 and the flat baffle 12. Thus, multiple cap-shaped items 1 can be stored in the flat holder sheet member 10 in a stack. At this time, the flat baffle 12 stops the storage cap-shaped items 1 from falling out of the flat holder sheet member 10. When going to use the storage cap-shaped items 1, the user can pick up the lowest one at first and move it away from the elongated slot 11 through the lower opening 111.

Further, the upper opening 110, the elongated slot 11 and the lower opening 111 are formed by means of one single cutting process applied to the flat holder sheet member 10. Further, the flat baffle 12 can be formed of a part of the flat holder sheet member 10 that is cut off from the flat holder sheet member 10 when making the upper opening 110, the elongated slot 11 and the lower opening 111.

Figure 4:
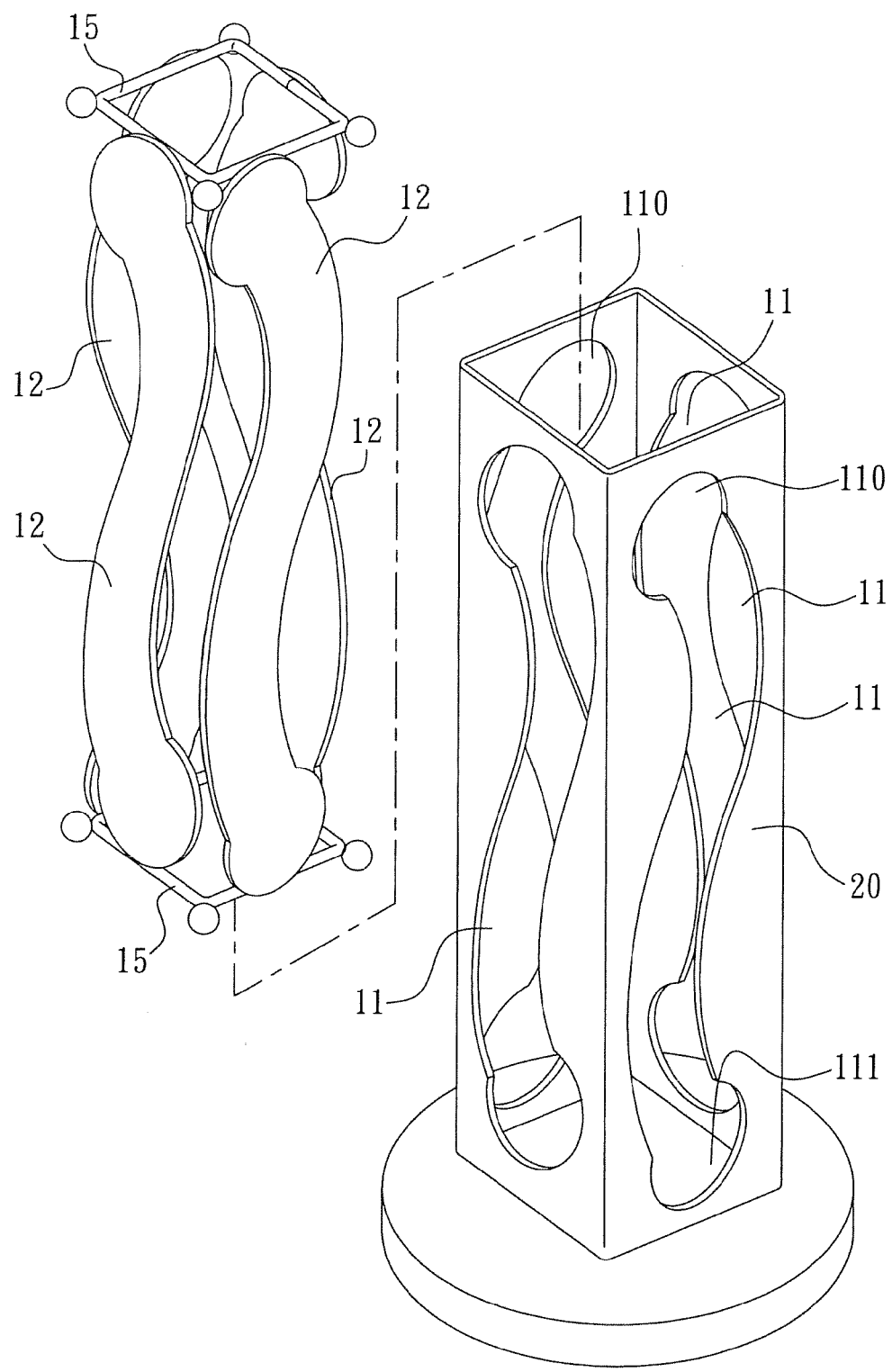
FIG. 4 is an exploded view of a rack in accordance with a second embodiment of the present invention.
Figure 5:
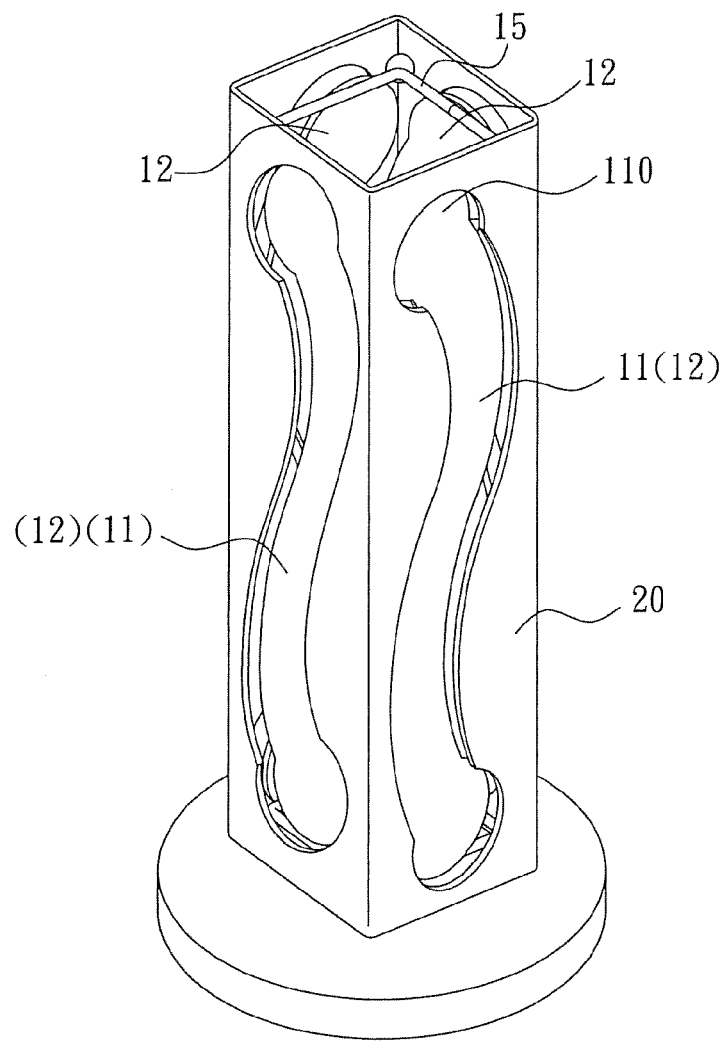
FIG. 5 is an oblique elevational assembly view of the rack in accordance with the second embodiment of the present invention.
Figure 6:
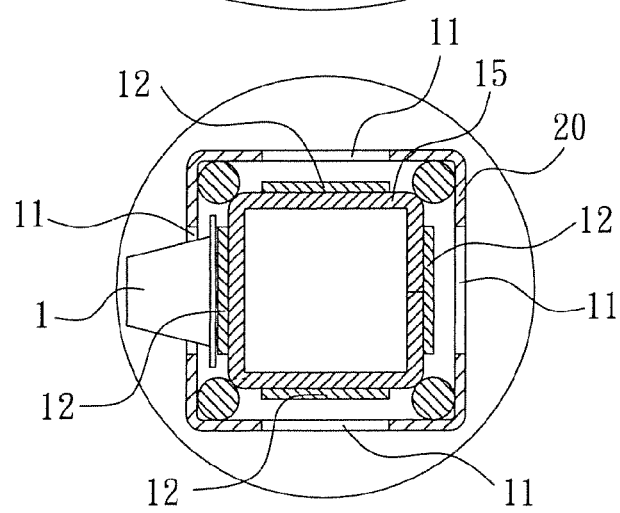
FIG. 6 is a top view of the second embodiment of the present invention, illustrating cap-shaped items installed in the flat holder sheet members.

FIGS. 4~6 illustrate a rack in accordance with a second embodiment of the present invention. According to this second embodiment, the rack comprises two rectangular open frames 15, 4 flat baffles 12 connected between the two rectangular open frames 15 at four sides, and a holder sheet member 20 made in the form of a rectangular tube and surrounding the rectangular open frames 15 and the flat baffle 12 for holding cap-shaped items 1. The holder sheet member 20 has an upper opening 110 and a lower opening 111 located on each of the four sides thereof at different elevations and an elongated slot 11 located on each of the four sides and connected between the respective upper opening 110 and the respective lower opening 111. Thus, cap-shaped items 1 can be stored in the elongated slots 11 in the four sides of the holder sheet member 20.

Figure 7:
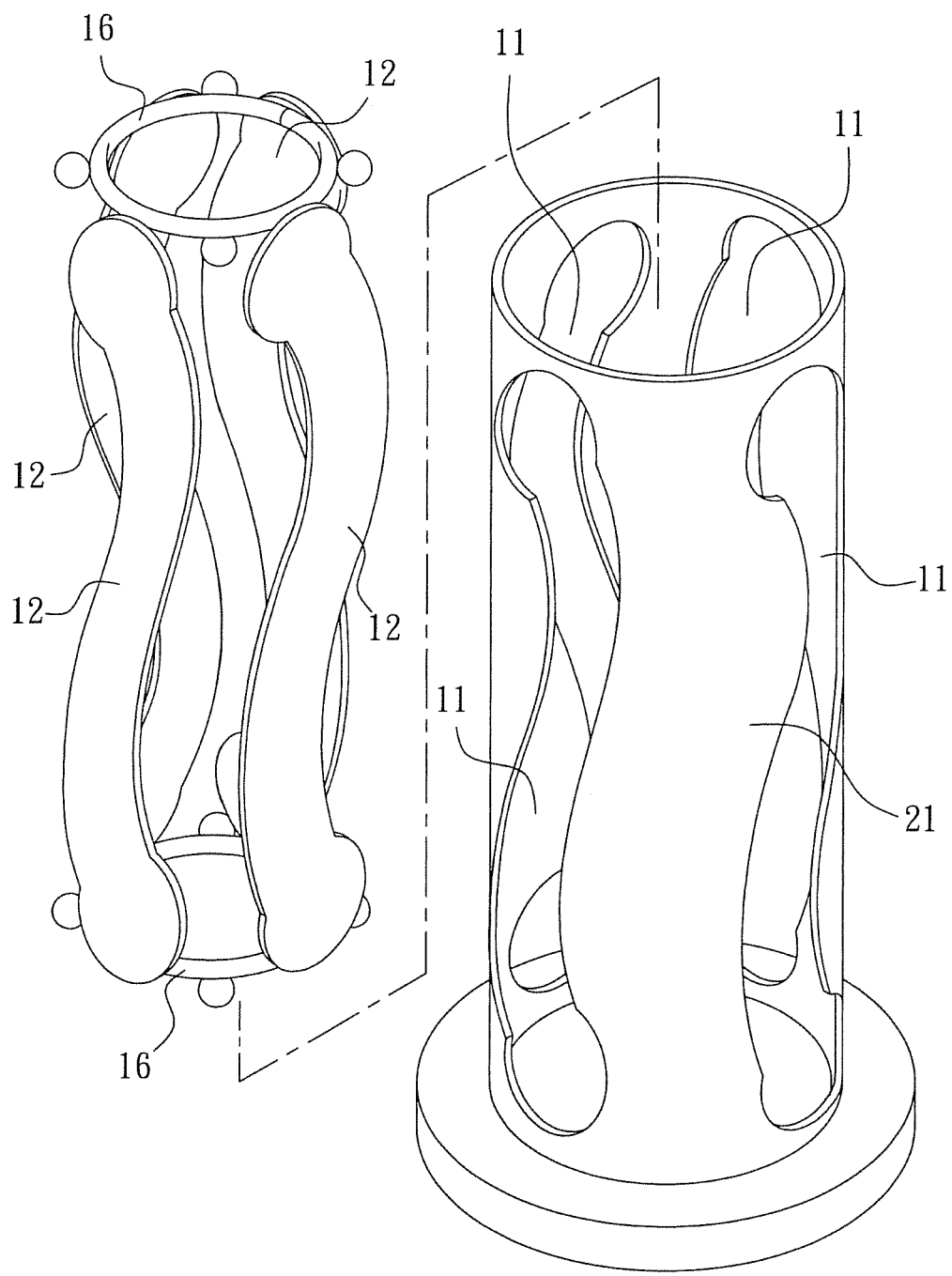
FIG. 7 is an exploded view of a rack in accordance with a third embodiment of the present invention.
Figure 8:
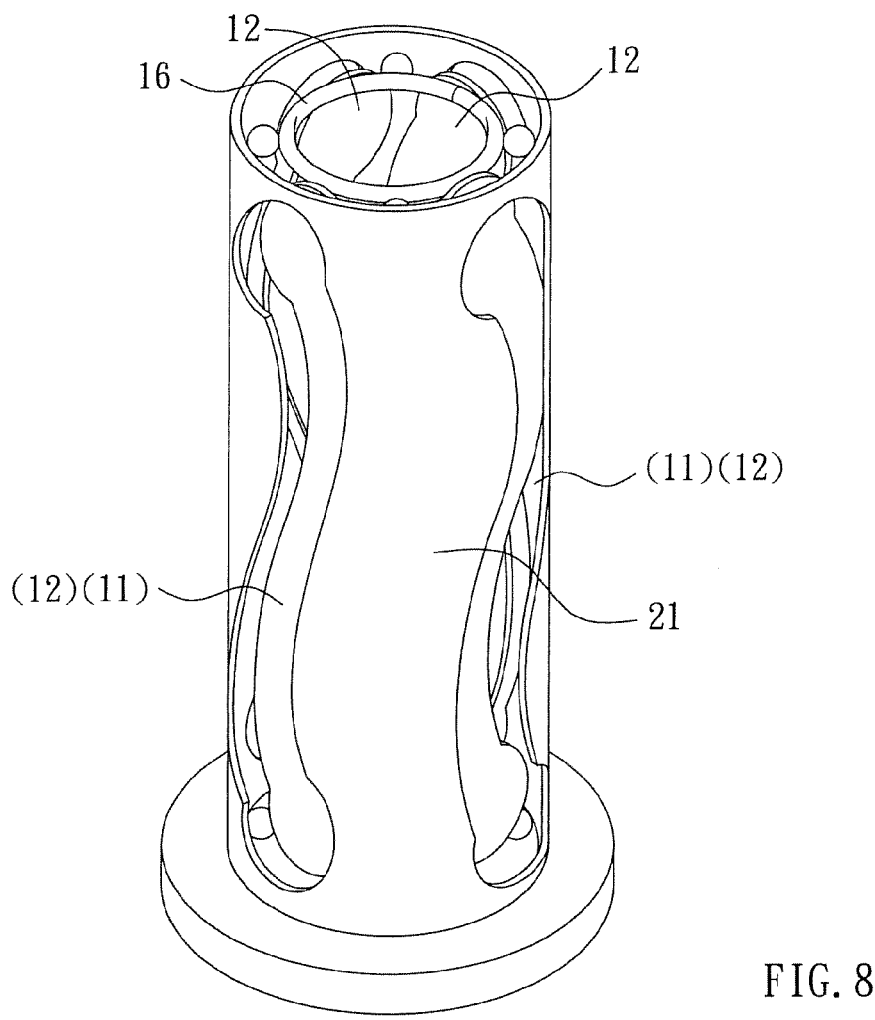
FIG. 8 is an oblique elevational assembly view of the rack in accordance with the third embodiment of the present invention.
Figure 9:
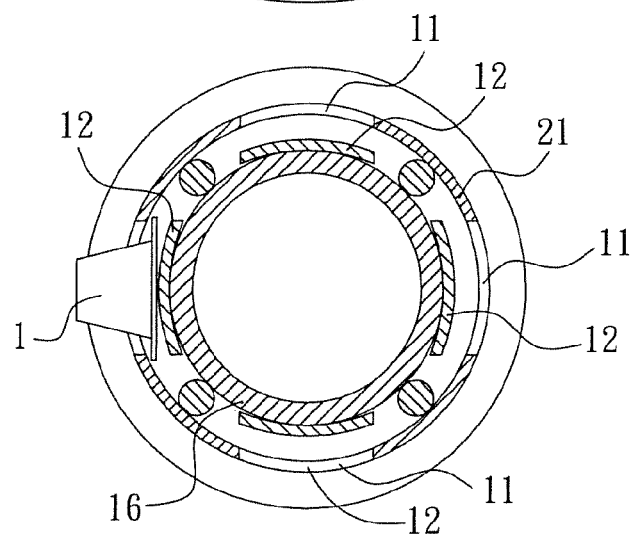
FIG. 9 is a top view of the second embodiment of the present invention, illustrating cap-shaped items installed in the circular holder sheet member.

FIGS. 7~9 illustrate a rack in accordance with a third embodiment of the present invention. According to this third embodiment, the rack comprises two circular open frames 16 arranged at different elevations, a plurality of flat baffles 12 connected between the two circular open frames 16 and equi-angularly spaced from one another, and a holder sheet member 21 made in the form of a circular tube and surrounding the rectangular open frames 15 and the flat baffle 12 for holding cap-shaped items 1. The holder sheet member 21 has a plurality of upper openings 110 and lower openings 111 disposed at different elevations and a plurality of elongated slots 11 respectively connected between the respective upper openings 110 and the respective lower openings 111. Thus, cap-shaped items 1 can be stored in the elongated slots 11 of the holder sheet member 21 in lines.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A rack, comprising:
   a supporting open frame,
   at least one flat baffle bonded to said supporting open frame, and
   a flat holder sheet member having a planar front surface, said flat holder sheet member surrounding said supporting open frame over said at least one flat baffle for holding cap-shaped items, said baffle being transversely spaced from said planar front surface, said flat holder sheet member comprising:
      at least one upper opening and at least one lower opening symmetrically arranged at two different elevations and
      at least one elongated slot formed through said planar front surface, said elongated slot extending between said at least one upper opening and said at least one lower opening to transversely oppose said at least one flat baffle, whereby a rim of said cap-shaped item is retained between said flat holder sheet member and said flat baffle.

2. The rack as claimed in claim 1, wherein said flat holder sheet member is arranged in the shape of a rectangular tube.

3. The rack as claimed in claim 1, wherein said flat holder sheet member is arranged in the shape of a circular tube.

* * * * *